United States Patent
Luan et al.

(10) Patent No.: US 8,578,943 B2
(45) Date of Patent: Nov. 12, 2013

(54) METAL-CONTAINING NANOWIRES PREPARED USING MESOPOROUS MOLECULAR SIEVES AS TEMPLATES, AND THEIR USE IN SMOKING ARTICLES FOR REMOVING CERTAIN GAS PHASE CONSTITUENTS FROM TOBACCO SMOKE

(75) Inventors: Zhaohua Luan, Midlothian, VA (US); Jay A Fournier, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 922 days.

(21) Appl. No.: 11/637,707

(22) Filed: Dec. 13, 2006

(65) Prior Publication Data

US 2007/0163611 A1    Jul. 19, 2007

Related U.S. Application Data

(60) Provisional application No. 60/751,668, filed on Dec. 20, 2005.

(51) Int. Cl.
*A24B 15/00*    (2006.01)

(52) U.S. Cl.
USPC ........... 131/331; 131/364; 131/334; 131/360; 427/239; 427/230; 427/243

(58) Field of Classification Search
None
See application file for complete search history.

(56) References Cited

U.S. PATENT DOCUMENTS

| | | |
|---|---|---|
| 5,098,684 A | 3/1992 | Kresge et al. |
| 5,102,643 A | 4/1992 | Kresge et al. |
| 5,108,725 A | 4/1992 | Beck et al. |
| 5,581,091 A | 12/1996 | Moskovits et al. |

(Continued)

FOREIGN PATENT DOCUMENTS

| | | |
|---|---|---|
| CN | 1375245 | 10/2002 |
| WO | 98/48456 | 10/1998 |

(Continued)

OTHER PUBLICATIONS

Martin, Membrane-Based Synthesis of Nanomaterials, 1996, Chem. Matter, 8, 1739-1746.*

(Continued)

*Primary Examiner* — Richard Crispino
*Assistant Examiner* — Phu Nguyen
(74) *Attorney, Agent, or Firm* — Buchanan Ingersoll & Rooney PC

(57) ABSTRACT

Cut filler compositions, smoking articles such as cigarettes, methods for making cigarettes and methods for treating cigarette smoke are provided, which involve the use of metal-containing nanowires. The metal-containing nanowires are capable of removing at least one constituent from tobacco smoke, preferably in a selective manner. The metal-containing nanowires may comprise any suitable metal, metal oxide or mixtures thereof. For example, the metal-containing nanowires comprise at least one transition or lanthanide metal or metal oxide thereof. Exemplary metals or metal oxides thereof include, but are not limited to, iron, copper, zinc, titanium, vanadium, palladium, cobalt, molybdenum and manganese. The metal-containing nanowires may be produced by (i) loading at least one metal-containing composition into a mesoporous molecular sieve substrate via repeated incipient-wetness impregnation followed by stepwise calcination to form said nanowires; and (ii) isolating the nanowires by extracting the mesoporous molecular sieve substrate, e.g., with aqueous NaOH.

8 Claims, 3 Drawing Sheets

(56) References Cited

U.S. PATENT DOCUMENTS

| | | | |
|---|---|---|---|
| 6,231,744 B1 | 5/2001 | Ying et al. | |
| 6,322,713 B1 | 11/2001 | Choi et al. | |
| 6,359,288 B1 | 3/2002 | Ying et al. | |
| 6,733,828 B2 * | 5/2004 | Chao et al. | 427/239 |
| 2002/0001977 A1 | 1/2002 | Gole et al. | |
| 2002/0055239 A1 | 5/2002 | Tuominen et al. | |
| 2005/0121047 A1 * | 6/2005 | Saoud et al. | 131/364 |

FOREIGN PATENT DOCUMENTS

| | | |
|---|---|---|
| WO | WO 2004/110184 A2 | 12/2004 |
| WO | WO 2005/039329 A | 5/2005 |
| WO | WO 2005/118133 A2 | 12/2005 |

OTHER PUBLICATIONS

Michael H. Huang, Amer. Choudrey, Peidong Yang: "Ag nanowire formation within mesoporous silica", Chemical Communications, vol. 12, 2000, pp. 1063-1064, XP002449334, GB Chemical Society, London, pp. 1063-1064.

International Search Report and Written Opinion dated Sep. 18, 2007 for PCT/IB2006/004140.

Notification of the First Office Action mailed Dec. 29, 2010 for Chinese Patent Application No. 200680048447.X (English translation of the same).

Official Action dated Apr. 18, 2013 for Japanese Appln. No. 2008-546690.

* cited by examiner

METAL-CONTAINING NANOWIRES PREPARED USING MESOPOROUS MOLECULAR SIEVES AS TEMPLATES, AND THEIR USE IN SMOKING ARTICLES FOR REMOVING CERTAIN GAS PHASE CONSTITUENTS FROM TOBACCO SMOKE

RELATED APPLICATIONS

This application claims priority under 35 U.S.C. 119 to U.S. Provisional Application No. 60/751,668 entitled METAL-CONTAINING NANOWIRES PREPARED USING MESOPOROUS MOLECULAR SIEVES AS TEMPLATES, AND THEIR USE IN SMOKING ARTICLES FOR REMOVING CERTAIN GAS PHASE CONSTITUENTS FROM TOBACCO SMOKE and filed on Dec. 20, 2005, the entire content of which is hereby incorporated by reference.

BACKGROUND

Certain filter materials have been suggested for incorporation into cigarette filters, including cotton, paper, cellulose, and certain synthetic fibers. However, such filter materials generally only remove particulate and condensable components from tobacco smoke. Thus, they are usually not optimal for the removal of certain gaseous components from tobacco smoke, e.g., volatile organic compounds. In light of this, a number of additives have been proposed in the art to supplement the performance of the filter materials.

Despite the developments to date, there remains an interest in developing improved and more efficient methods and compositions for removing certain constituents in mainstream tobacco smoke. Preferably, such methods and compositions should not involve expensive or time consuming manufacturing and/or processing steps. More preferably, such methods and compositions should be able to selectively remove at least one constituent of mainstream tobacco smoke in the filter region of the cigarette and/or along the length of the cigarette during smoking.

SUMMARY

Cut filler, filter and paper compositions, smoking articles such as cigarettes and methods for making cigarettes and filters are provided which involve the use of metal-containing nanowires capable of removing at least one constituent from tobacco smoke.

In one embodiment, cut filler compositions are provided, which comprise tobacco, and metal-containing nanowires, wherein the metal-containing nanowires are capable of removing at least one constituent from tobacco smoke.

In another embodiment, smoking articles are provided, which comprise metal-containing nanowires, wherein the metal-containing nanowires are capable of removing at least one constituent from tobacco smoke. Examples of smoking articles include, for example, cigarettes, pipes, cigars and non-traditional cigarettes. The metal-containing nanowires may be dispersed in a cut filler, located in a paper wrapper and/or located in a filter portion of the smoking article. These smoking articles may preferably comprise up to about 200 mg of the metal-containing nanowires, preferably greater than about 5 mg of the metal-containing nanowires.

The filter for the smoking article may be a mono filter, a dual filter, a triple filter, a cavity filter, a recessed filter or a free-flow filter. The metal-containing nanowires may be incorporated into one or more filter parts selected from the group consisting of: shaped paper insert, a plug, a space, cigarette filter paper, a cellulose acetate sleeve, a polypropylene sleeve, and a free-flow sleeve.

Preferably, the metal-containing nanowires are capable of selectively removing at least one constituent from mainstream smoke. Examples of constituents that may be removed include, but are not limited to, aldehydes, carbon monoxide, 1,3-butadiene, isoprene, acrolein, acrylonitrile, hydrogen cyanide, o-toluidine, 2-naphtylamine, nitrogen oxide, benzene, N-nitrosonornicotine, phenol, catechol, benz(a)anthracene, benzo(a)pyrene, and mixtures thereof.

Preferably, the metal-containing nanowires are present in an amount effective to remove at least one constituent from mainstream tobacco smoke; for example, preferably at least about 30% or more preferably at least about 50% of at least one constituent may be removed from mainstream tobacco smoke. The nanowires may be less than 500 nm in diameter, less than 100 nm in diameter, less than 5 nm in diameter and/or have an aspect ratio between about 100 to about 1000.

The metal-containing nanowires may comprise any suitable metal, metal oxide or mixtures thereof. For example, the metal-containing nanowires may comprise at least one transition metal or metal oxide thereof selected from one or more of a transition or lanthanide metal or a metalloid atom and mixtures thereof, e.g., B, Al, Si, Ti, V, Mn, Fe, Co, Cu, Zn, Ge, Y, Zr, Nb, Mo, Ru, Rh, Pd, Ag, Ce, Hf, Ta, W, Re, Ir, Pt and Au. Particularly preferred metals are iron, copper, zinc, titanium, vanadium, palladium, cobalt, molybdenum and/or manganese.

The metal-containing nanowires may be produced by (i) loading at least one metal-containing composition into a mesoporous molecular sieve substrate via one or more incipient-wetness impregnation steps followed by stepwise calcination to form said nanowires; and (ii) isolating the nanowires by removing the mesoporous molecular sieve substrate, e.g., by extraction with a suitable etching solution. The mesoporous molecular sieve substrate preferably comprises pores having an average diameter from about 20 Å to about 300 Å. Examples of mesoporous molecular sieve substrates that may be used to synthesize the metal-containing nanowires include MCM-41, MCM-48 and SBA-15, for instance.

In yet another embodiment, a method for making a cigarette, comprises (i) adding an effective amount of at least one metal-containing nanowire to a cut filler, wherein the metal-containing nanowire is capable of removing at least one constituent from tobacco smoke; (ii) providing the cut filler comprising the metal-containing nanowire to a cigarette making machine to form a tobacco column; and (iii) placing a paper wrapper around the tobacco column to form a tobacco rod of a cigarette.

In an embodiment, methods for making a cigarette are provided, which comprise (i) providing a cut filler to a cigarette making machine to form a tobacco column; (ii) placing a paper wrapper around the tobacco column to form a tobacco rod; and (iii) attaching a cigarette filter to the tobacco rod using tipping paper to form the cigarette, wherein the cigarette filter comprises an effective amount of at least one metal-containing nanowire capable of removing at least one constituent from mainstream tobacco smoke.

Another embodiment relates to methods for making a cigarette, comprising (i) providing the cut filler to a cigarette making machine so as to form a tobacco column; and (ii) placing a paper wrapper around the tobacco column to form a tobacco rod of a cigarette, wherein the paper wrapper comprises an effective amount of at least one metal-containing nanowire capable of removing at least one constituent from sidestream tobacco smoke.

Another embodiment relates to methods for making a cigarette filter, comprising incorporating an effective amount of at least one metal-containing nanowire capable of removing at least one constituent from mainstream tobacco smoke into a cigarette filter.

In another embodiment, a method is provided of treating mainstream smoke of a smoking article to remove at least one constituent from mainstream tobacco smoke.

DETAILED DESCRIPTION

Figure 1:
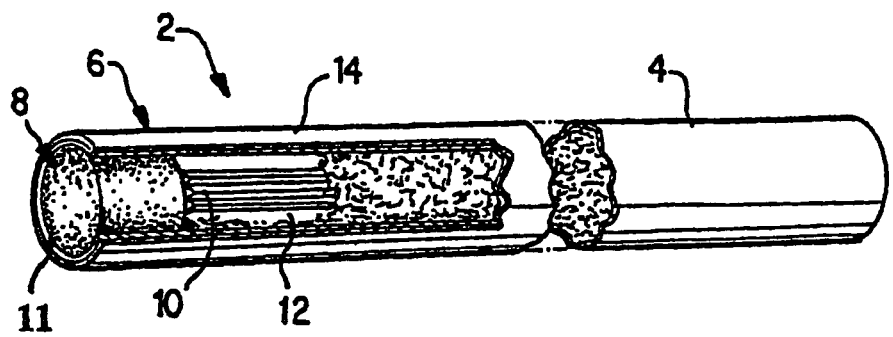
FIG. 1 is a partially exploded perspective view of a cigarette incorporating one embodiment wherein folded paper containing metal-containing nanowires is inserted into a hollow portion of a tubular filter element of the cigarette.

Cut filler, filter and paper compositions, smoking articles such as cigarettes, methods for making cigarettes and methods for smoking cigarettes are provided which involve the use of metal-containing nanowires to remove one or more constituents from mainstream and sidestream tobacco smoke. The term "mainstream" smoke refers to the mixture of gases issuing through the mouth or filter end of a smoking article such as a cigarette, pipe, cigar or nontraditional cigarette, e.g., the amount of smoke issuing or drawn from the mouth end of a cigarette during smoking of the cigarette.

Metal-containing nanowires are used for selective and effective removal of certain selected constituents of mainstream tobacco smoke. Preferably, other constituents in mainstream smoke, i.e., such as those that contribute to flavor, will not be targeted for removal. By "removed" is meant that the concentration of at least some of at least one constituent in mainstream smoke is lowered. This can be accomplished by a variety of mechanisms. For example, the constituent may chemically react with the metal-containing nanowires. Alternatively, the constituent may be adsorbed on the surface of the metal-containing nanowire, and thus be removed from the tobacco smoke before reaching the smoker or being given off as second-hand smoke.

By "selective removal" is meant that certain constituents are substantially removed from mainstream smoke, while other constituents are not substantially removed. The term "selective" also encompasses "preferential" removal of certain constituents from mainstream smoke, i.e., where more than one constituent may be removed, but where one constituent is removed to a greater extent than another component.

The nanowires used may be produced by any suitable technique. For instance, the nanowires may be formed by loading various metal-containing solutions into a mesoporous molecular sieve substrate, which is subjected to one or more incipient-wetness impregnation steps followed by stepwise calcination.

The metal-containing solutions used for the incipient-wetness impregnation may comprise any suitable precursor and/or at least one metal ion. The solvent for the metal-containing solutions should be selected such that it facilitates impregnation into the pores of the mesoporous molecular sieves. Examples of suitable solvents include ethanol and/or water, for example.

Any suitable mesoporous molecular sieve substrate may be used to direct the synthesis of the metal-containing nanowires. Exemplary materials are described, for example, in patents relating to MCM-41, MCM-48 and SBA-15; such as U.S. Pat. Nos. 5,108,725; 5,098,684 and 5,102,643, which are all hereby incorporated by reference in their entirety. The diameter of the nanowires can be controlled through selection of a mesoporous molecular sieve substrate having an appropriate average pore size and pore distribution. By selecting and using a mesoporous molecular sieve substrate with uniform dimensions, it is possible to form nanowires of very uniform dimensions. Also, the final structure of the nanowires can be controlled by selecting a one-dimensional material to form a series of nanowires in parallel, or a three-dimensional material with interconnected pores to form an interconnected network of nanowires.

Mesoporous silica can be commercially obtained, or synthesized using any suitable known or modified procedure. See, e.g., D. Zhao, et al., Science, 279:465 (1998) and Huang, M. H. et al., Chem. Commun., pp. 1063-1064 (2000). For instance, mesoporous silica SBA-15 can be synthesized using tri-block copolymer poly(ethylene oxide)-poly(propylene oxide)-poly(ethylene oxide) $EO_{20}PO_{70}EO_{20}$ as a template in acidic conditions. A solution comprising $EO_{20}PO_{70}EO_{20}$:2M HCl:TEOS:$H_2O$ in about a 2:60:4.25:15 mass ratio can be prepared and stirred for several hours at about 40° C. and then heated at 100° C. overnight. The solid products can be filtered off and calcined at 500° C. for 5 hours. The samples can be analyzed, i.e., using techniques such as low-angle X-ray diffraction and/or transmission electron microscopy, to verify that they have the desired mesoporous structure, as well as any desired specifications relating to diameter, etc.

In order to prepare nanowires, one or more incipient-wetness impregnation steps followed by stepwise calcination can be used. The mesoporous molecular sieve materials are soaked in a metal-containing solution to form a suspension, which is stirred at ambient temperatures for a sufficient time to allow the solution to penetrate the pores of the mesoporous molecular sieve materials. In a preferred embodiment, the suspension may be stirred for several hours up to overnight. The suspension is then filtered, rinsed with deionized water, and subjected to a calcination step under suitable conditions to decompose the impregnated metal-containing solution to form wires. For instance, the calcination step may be carried out at temperatures between about 250° C. to about 400° C. under either an inert or ambient atmosphere.

Finally, the nanowires can be isolated by extracting the surrounding molecular sieve substrate using a suitable etching solution.

The metal-containing nanowires, as described above, may be provided along the length of a tobacco rod by distributing the metal-containing nanowires on the tobacco or incorporating the mixture into the cut filler tobacco using any suitable method. The metal-containing nanowires may be provided in the form of a powder or in a solution in the form of a dispersion. In a preferred method, metal-containing nanowires in the form of a dry powder are dusted on the cut filler tobacco. The metal-containing nanowire may also be present in the form of a solution and sprayed on the cut filler tobacco. Alternatively, the tobacco may be coated with a solution containing the metal-containing nanowires. The metal-containing nanowires may also be added to the cut filler tobacco stock supplied to the cigarette making machine or added to a tobacco column prior to wrapping cigarette paper around the cigarette rod.

The metal-containing nanowires will preferably be distributed throughout the tobacco rod portion of a cigarette, the cigarette paper and/or the cigarette filter. By providing the metal-containing nanowires throughout the entire tobacco rod, it is possible to reduce the amount of carbon monoxide and/or nitric oxide throughout the cigarette, and particularly at the combustion region and in the pyrolysis zone.

Any conventional or modified cigarette making technique may be used to incorporate the metal-containing nanowires. The resulting cigarettes can be manufactured to any known specifications using standard or modified cigarette making techniques and equipment. Typically, the cut filler composition is optionally combined with other cigarette additives, and provided to a cigarette making machine to produce a tobacco column, which is then wrapped in cigarette paper, and optionally tipped with filters.

Any suitable tobacco mixture may be used for the cut filler. Examples of suitable types of tobacco materials include flue-cured, Burley, Maryland or Oriental tobaccos, the rare or specialty tobaccos, and blends thereof. The tobacco material can be provided in the form of tobacco lamina; processed tobacco materials such as volume expanded or puffed tobacco, processed tobacco stems such as cut-rolled or cut-puffed stems, reconstituted tobacco materials; or blends thereof. The cut filler may also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives, e.g., burn additives, combustion modifying agents, coloring agents, binders, etc.

The resulting cigarettes can be manufactured to any desired specification using standard or modified cigarette making techniques and equipment. The cigarettes may range from about 50 mm to about 120 mm in length.

"Smoking" of a cigarette includes the heating or combustion of the cigarette to form smoke, and drawing the smoke through the smoking article. Generally, smoking of a cigarette involves lighting one end of the cigarette and drawing the cigarette smoke through the mouth end of the cigarette, while the tobacco contained therein undergoes a combustion reaction. However, the cigarette may also be smoked by other methods. For example, the cigarette may be smoked by heating the cigarette and/or heating using an electrical heater as described in commonly-assigned U.S. Pat. Nos. 6,053,176; 5,934,289, 5,591,368 or 5,322,075, for example.

Any conventional or modified method of making cigarette filters may be used to incorporate the metal-containing nanowires. For example, various cigarette filter arrangements and methods for making filters are described in commonly-assigned U.S. Pat. No. 6,209,547, which is hereby incorporated in its entirety.

FIG. 1 illustrates a cigarette 2 having a tobacco rod 4, a filter portion 6, and a mouthpiece filter plug 8. As shown, metal-containing nanowires can be loaded onto folded paper 10 inserted into a hollow cavity such as the interior of a free-flow sleeve 12 forming part of the filter portion 6.

Figure 2:
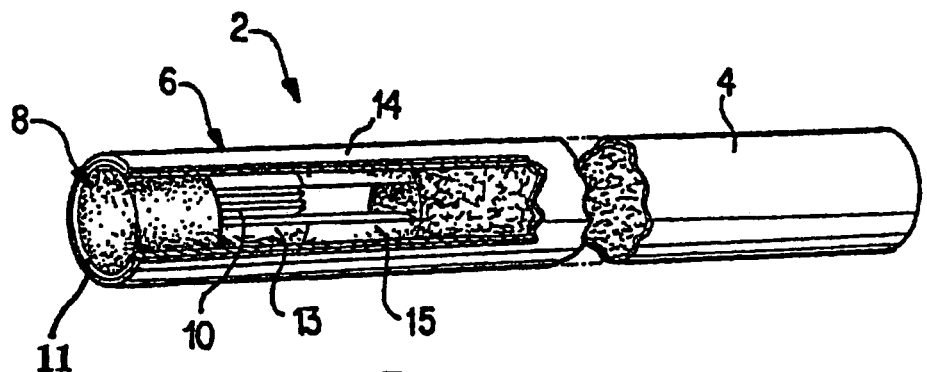
FIG. 2 is partially exploded perspective view of another embodiment wherein metal-containing nanowires are incorporated in folded paper and inserted into a hollow portion of a first free-flow sleeve of a tubular filter element next to a second free-flow sleeve.

FIG. 2 shows a cigarette 2 having a tobacco rod 4 and a filter portion 6, wherein the folded paper 10 is located in the hollow cavity of a first free-flow sleeve 13 located between the mouthpiece filter 8 and a second free-flow sleeve 15. The paper 10 can be used in forms other than as a folded sheet. For instance, the paper 10 can be deployed as one or more individual strips, a wound roll, etc. In whichever form, a desired amount of the metal-containing nanowires can be provided in the cigarette filter portion by a combination of the coated amount of reagent/area of the paper and/or the total area of coated paper employed in the filter (e.g., higher amounts of metal-containing nanowires can be provided simply by using larger pieces of coated paper). In the cigarettes shown in FIGS. 1 and 2, the tobacco rod 4 and the filter portion 6 are joined together with tipping paper 14. In both cigarettes, the filter portion 6 may be held together by filter overwrap 11.

Metal-containing nanowires can be incorporated into the filter paper in a number of ways. For example, metal-containing nanowires can be mixed with water to form a slurry. The slurry can then be coated onto pre-formed filter paper and allowed to dry. The filter paper can then be incorporated into the filter portion of a cigarette in the manner shown in FIGS. 1 and 2. Alternatively, the dried paper can be wrapped into a plug shape and inserted into a filter portion of the cigarette. For example, the paper can be wrapped into a plug shape and inserted as a plug into the interior of a free-flow filter element such as a polypropylene or cellulose acetate sleeve. In another arrangement, the paper can comprise an inner liner of such a free-flow filter element.

Alternatively, metal-containing nanowires can be added to the filter or cigarette paper during the paper-making process. For example, metal-containing nanowires can be mixed with bulk cellulose to form a cellulose pulp mixture. The mixture can be then formed into filter or cigarette paper according to any conventional or modified methods.

Figure 3:
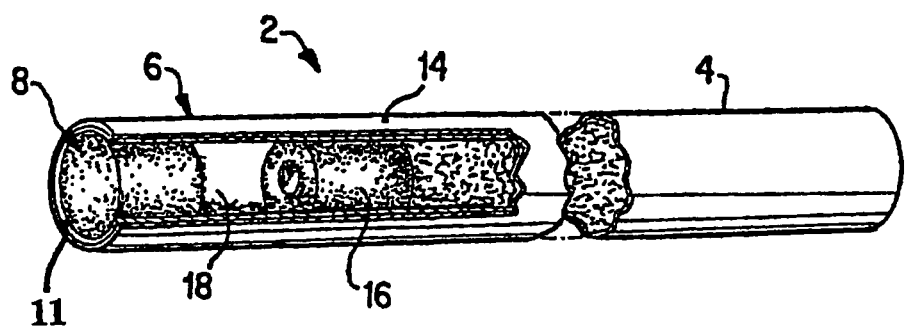
FIG. 3 is a partially exploded perspective view of another embodiment wherein metal-containing nanowires are incorporated in a plug-space-plug filter element.

In another preferred embodiment, metal-containing nanowires are incorporated into the fibrous material of the cigarette filter portion itself. Such filter materials include, but are not limited to, fibrous filter materials including paper such as tipping paper or plugs of fibers such as cellulose acetate fibers and polypropylene fibers. This embodiment is illustrated in FIG. 3, which shows a cigarette 2 comprised of a tobacco rod 4 and a filter portion 6 in the form of a plug-space-plug filter having a mouthpiece filter 8, a plug 16, and a space 18. The plug 16 can comprise a tube or solid piece of material such as polypropylene or cellulose acetate fibers. The tobacco rod 4 and the filter portion 6 are joined together with tipping paper 14. The filter portion 6 may include a filter overwrap 11. The filter overwrap 11 containing traditional fibrous filter material and metal-containing nanowires can be incorporated in or on the filter overwrap 11 such as by being coated thereon. Alternatively, metal-containing nanowires can be incorporated in the mouthpiece filter 8, in the plug 16, and/or in the space 18. Moreover, metal-containing nanowires can be incorporated in any element of the filter portion of a cigarette. For example, the filter portion may consist only of the mouthpiece filter 8 and metal-containing nanowires can be incorporated in the mouthpiece filter 8 and/or in the tipping paper 14.

Figure 4:
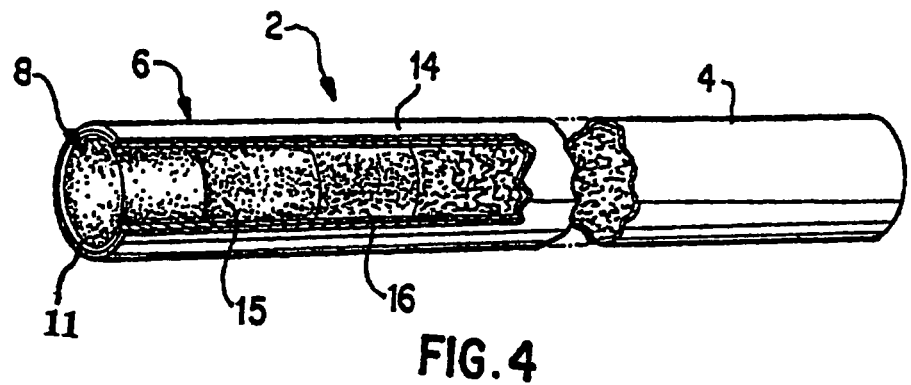
FIG. 4 is a partially exploded perspective view of another embodiment wherein metal-containing nanowires are incorporated in a three-piece filter element having three plugs.

FIG. 4 shows a cigarette 2 comprised of a tobacco rod 4 and filter portion 6. This arrangement is similar to that of FIG. 3 except the space 18 is filled with granules of metal-containing nanowires or a plug 15 made of material such as fibrous polypropylene or cellulose acetate containing metal-containing nanowires. As in the previous embodiment, the plug 16 can be hollow or solid and the tobacco rod 4 and filter portion 6 are joined together with tipping paper 14. There is also a filter overwrap 11.

Figure 5:
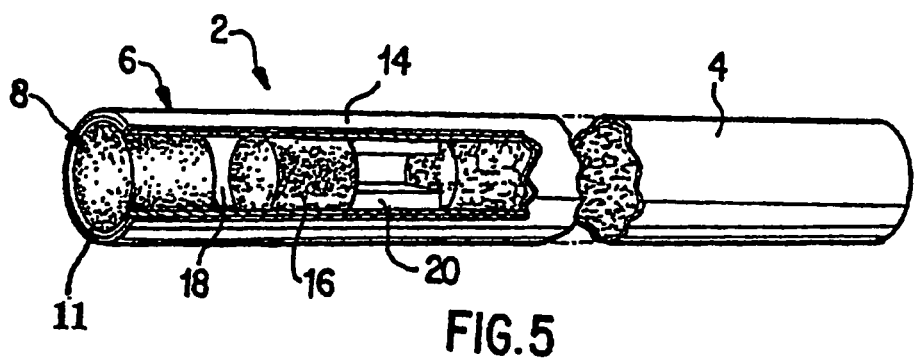
FIG. 5 is a partially exploded perspective view of another embodiment wherein metal-containing nanowires are incorporated in a four-piece filter element having a plug-space-plug arrangement and a hollow sleeve.

FIG. 5 shows a cigarette 2 comprised of a tobacco rod 4 and a filter portion 6 wherein the filter portion 6 includes a mouthpiece filter 8, a filter overwrap 11, tipping paper 14 to join the tobacco rod 4 and filter portion 6, a space 18, a plug 16, and a hollow sleeve 20. Metal-containing nanowires can be incorporated into one or more elements of the filter portion 6. For instance, metal-containing nanowires can be incorporated into the sleeve 20 or granules of metal-containing nanowires can be filled into the space within the sleeve 20. If desired, the plug 16 and sleeve 20 can be made of material such as fibrous polypropylene or cellulose acetate containing metal-containing nanowires. As in the previous embodiment, the plug 16 can be hollow or solid.

Figure 6:
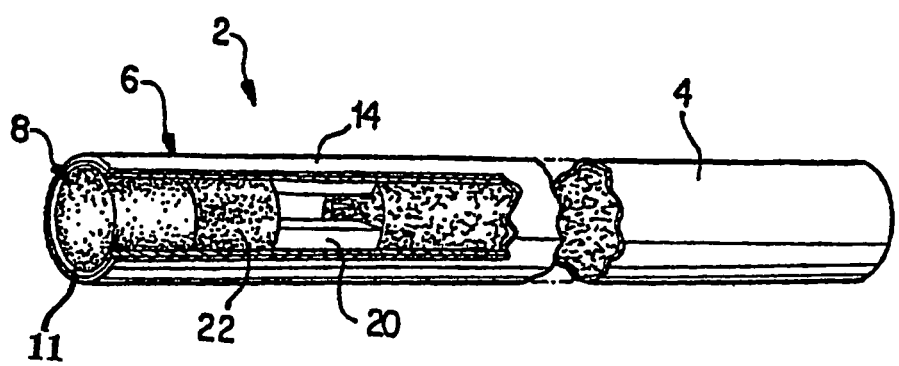
FIG. 6 is a partially exploded perspective view of another embodiment wherein metal-containing nanowires are incorporated in a three-part filter element having two plugs and a hollow sleeve.
Figure 7:
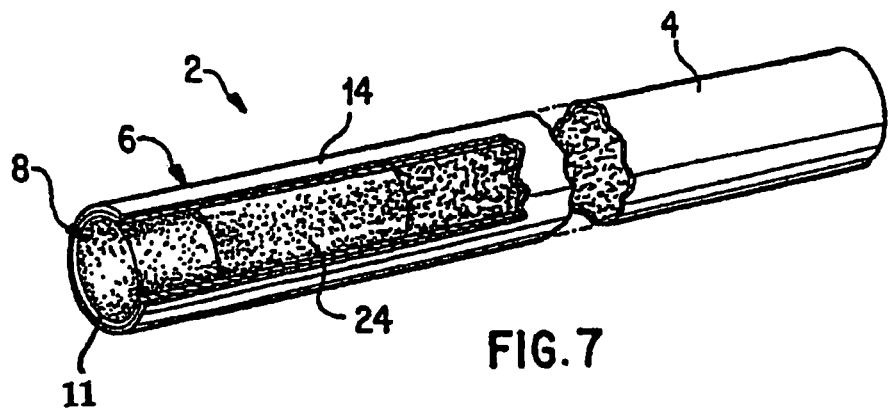
FIG. 7 is a partially exploded perspective view of another embodiment wherein metal-containing nanowires are incorporated in a two-part filter element having two plugs.

FIGS. 6 and 7 show further modifications of the filter portion 6. In FIG. 6, cigarette 2 is comprised of a tobacco rod 4 and filter portion 6. The filter portion 6 includes a mouthpiece filter 8, a filter overwrap 11, a plug 22, and a sleeve 20, and metal-containing nanowires can be incorporated in one or more of these filter elements. In FIG. 7, the filter portion 6 includes a mouthpiece filter 8 and a plug 24, and metal-containing nanowires can be incorporated in one or more of these filter elements. Like the plug 16, the plugs 22 and 24 can be solid or hollow. In the cigarettes shown in FIGS. 6 and 7, the tobacco rod 4 and filter portion 6 are joined together by tipping paper 14.

Various techniques can be used to apply metal-containing nanowires to filter fibers or other substrate supports. For example, metal-containing nanowires can be added to the filter fibers before they are formed into a filter cartridge, e.g., a tip for a cigarette. Metal-containing nanowires can be added to the filter fibers, for example, in the form of a dry powder or a slurry. If metal-containing nanowires are applied in the form of a slurry, the fibers are allowed to dry before they are formed into a filter cartridge.

In another preferred embodiment, metal-containing nanowires are employed in a hollow portion of a cigarette filter. For example, some cigarette filters have a plug/space/plug configuration in which the plugs comprise a fibrous filter material and the space is simply a void between the two filter plugs. That void can be filled with metal-containing nanowires. An example of this embodiment is shown in FIG. 3. The metal-containing nanowires can be in granular form or can be loaded onto a suitable support such as a fiber or thread.

Figure 8:
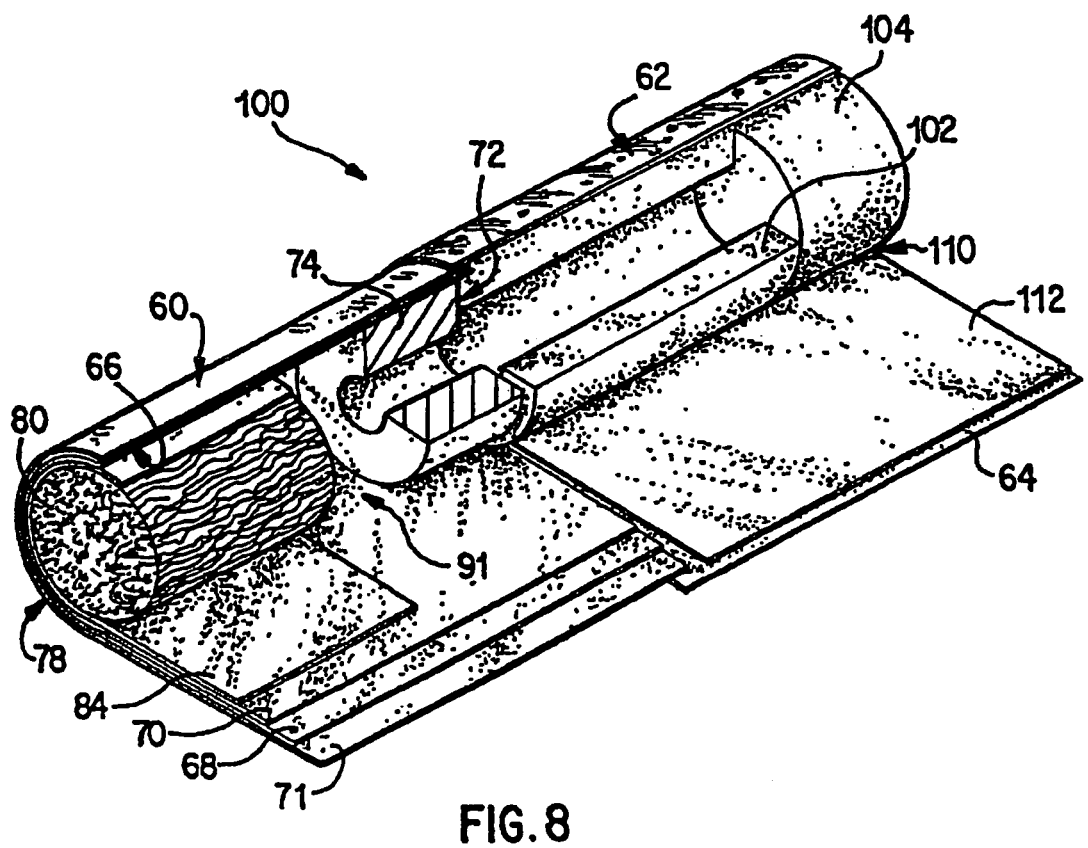
FIG. 8 is a partially exploded perspective view of another embodiment wherein metal-containing nanowires are incorporated in a filter element which may be used in a smoking article.

In another embodiment, the metal-containing nanowires are employed in a filter portion of a cigarette for use with a smoking device as described in commonly-assigned U.S. Pat. No. 5,692,525, the entire content of which is hereby incorporated by reference. FIG. 8 illustrates one type of construction of a cigarette 100 which can be used with an electrical smoking device. As shown, the cigarette 100 includes a tobacco rod 60 and a filter portion 62 joined by tipping paper 64. The filter portion 62 preferably contains a tubular free-flow filter element 102 and a mouthpiece filter plug 104. The free-flow filter element 102 and mouthpiece filter plug 104 may be joined together as a combined plug 110 with plug wrap 112.

The tobacco rod 60 can have various forms incorporating one or more of the following items: an overwrap 71, another tubular free-flow filter element 74, a cylindrical tobacco plug 80 preferably wrapped in a plug wrap 84, a tobacco web 66 comprising a base web 68 and tobacco flavor material 70, and a void space 91. The free-flow filter element 74 provides structural definition and support at the tipped end 72 of the tobacco rod 60. At the free end 78 of the tobacco rod 60, the tobacco web 66 together with overwrap 71 are wrapped about cylindrical tobacco plug 80. Various modifications can be made to a filter arrangement for such a cigarette incorporating the metal-containing nanowires.

In such a cigarette, metal-containing nanowires can be incorporated in various ways such as by being loaded onto paper or other substrate material which is fitted into the passageway of the tubular free-flow filter element 102 therein. The metal-containing nanowires may also be deployed as a liner or a plug in the interior of the tubular free-flow filter element 102. Alternatively, metal-containing nanowires can be incorporated into the fibrous wall portions of the tubular free-flow filter element 102 itself. For instance, the tubular free-flow filter element or sleeve 102 can be made of suitable materials such as polypropylene or cellulose acetate fibers and metal-containing nanowires can be mixed with such fibers prior to or as part of the sleeve forming process.

In another embodiment, metal-containing nanowires can be incorporated into the mouthpiece filter plug 104 instead of in the element 102. However, as in the previously described embodiments, the metal-containing nanowires may be incorporated into more than one portion of a filter such as by being incorporated into the mouthpiece filter plug 104 and into the tubular free-flow filter element 102. The filter portion 62 of FIG. 8 can also be modified to create a void space into which the metal-containing nanowires can be inserted.

As explained above, the metal-containing nanowires can be incorporated in various support materials. When metal-containing nanowires are used in filter paper, the metal-containing nanowires may be incorporated in support particles having an average particle size of up to 100 μm, preferably less than 30 μm. When the metal-containing nanowires are used in granular form, larger support particles may be used. Such support particles preferably have a mesh size of from 18 to 60 mesh (1000 to 250 microns, U.S. Standard, ASTM E11). To form such particles, larger particles of agglomerated material can be broken up into smaller particles having a desired size by any suitable technique, such as milling. The smaller particles can be separated to produce a desired particle size range by any suitable technique, such as sieving.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A smoking article comprising metal-containing nanowires having uniform dimensions, wherein the metal-containing nanowires are capable of removing at least one constituent from tobacco smoke, wherein the at least one constituent is selected from the group consisting of aldehydes, carbon monoxide, 1,3-butadiene, isoprene, acrolein, acrylonitrile, hydrogen cyanide, o-toluidine, 2-naphtylamine, nitrogen oxide, benzene, N-nitrosonornicotine, phenol, catechol, benz (a)anthracene, benzo(a)pyrene, and mixtures thereof, and the metal-containing nanowires are present in an amount effective to remove at least about 30% of at least one constituent from mainstream smoke;

wherein the metal-containing nanowires are less than 100 nm in diameter and have an aspect ratio of length to width between about 100 to about 1000 or the metal-containing nanowires are less than 5 nm in diameter;

wherein the metal-containing nanowires are incorporated in support particles having a particle size of 100 μm or less located in a filter portion of the smoking article and the metal-containing nanowires are disposed on a cut filler of the smoking article;

wherein the metal-containing nanowires are produced by:

(i) loading at least one metal-containing composition into a mesoporous molecular sieve substrate via repeated incipient-wetness impregnation followed by stepwise calcination to form said metal-containing nanowires; and (ii) isolating the nanowires by extracting the mesoporous molecular sieve substrate;

and wherein the metal-containing nanowires comprise a metal, a metal oxide or mixtures thereof, comprising at least one metal or metal oxide thereof selected from the group consisting of iron, copper, zinc, titanium, vanadium, silver, palladium, cobalt, molybdenum and manganese.

2. The smoking article of claim 1, wherein the mesoporous molecular sieve substrate is selected from the group consisting of MCM-41, MCM-48 and SBA-15.

3. The smoking article of claim 1, wherein the smoking article contains greater than about 5 mg and up to about 200 mg of the metal-containing nanowires, and the article is a cigarette.

4. The smoking article of claim 3, wherein the metal-containing nanowires are also located in a paper wrapper.

5. The smoking article of claim 3, wherein the metal-containing nanowires are incorporated into one or more filter parts selected from the group consisting of:

shaped paper insert, a plug, a space, cigarette filter paper, a cellulose acetate sleeve, a polypropylene sleeve, and a free-flow sleeve.

6. A method of making the cigarette of claim 3, the method comprising:

(i) providing a cut filler to a cigarette making machine to form a tobacco column;

(ii) placing a paper wrapper around the tobacco column; and (iii) attaching a cigarette filter to the tobacco rod using tipping paper to form the cigarette, wherein at least the cigarette filter and the cut filler comprises an effective amount of metal-containing nanowires capable of removing at least one constituent from mainstream tobacco smoke.

7. A method of treating mainstream smoke of a smoking article of claim 3, comprising drawing mainstream smoke through the cigarette and removing at least one constituent of the mainstream smoke with the metal containing nanowires.

8. The smoking article of claim 1, wherein the filter portion is a mono filter, a dual filter, a triple filter, a cavity filter, a recessed filter or a free-flow filter.

* * * * *